May 14, 1963 C. M. WHEELER ETAL 3,089,971
BEARING ARRANGEMENT FOR EDDY CURRENT COUPLING
Filed June 25, 1959 2 Sheets-Sheet 1

INVENTORS
CHARLES M. WHEELER
PHILIP M. FOLGER
BY Vernon F. Kalb
ATTORNEY

May 14, 1963 C. M. WHEELER ETAL 3,089,971
BEARING ARRANGEMENT FOR EDDY CURRENT COUPLING
Filed June 25, 1959 2 Sheets-Sheet 2
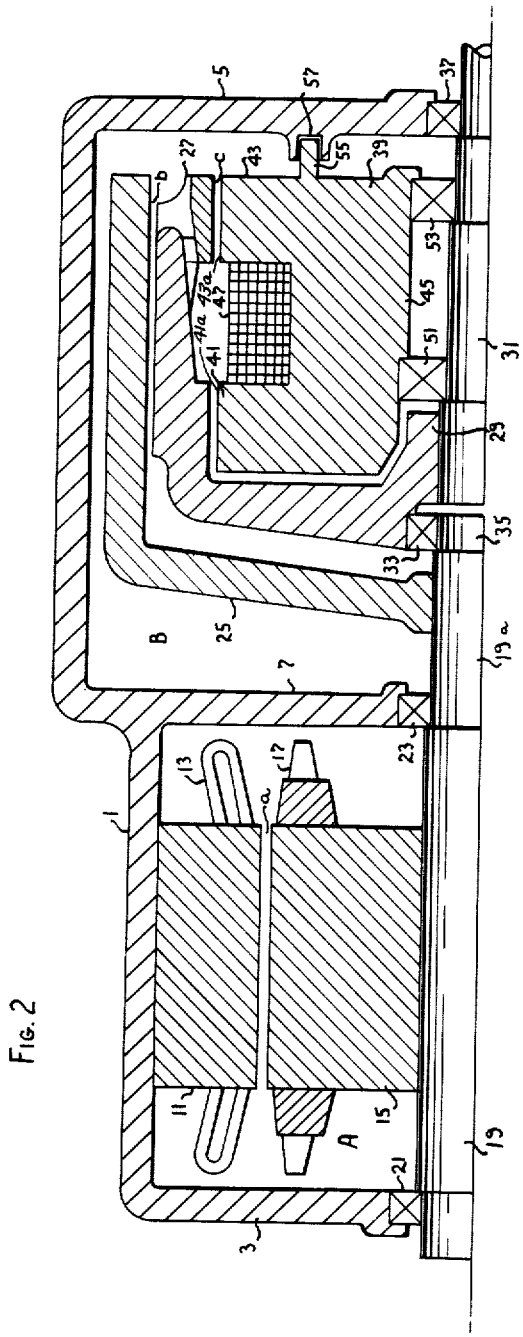
FIG. 2
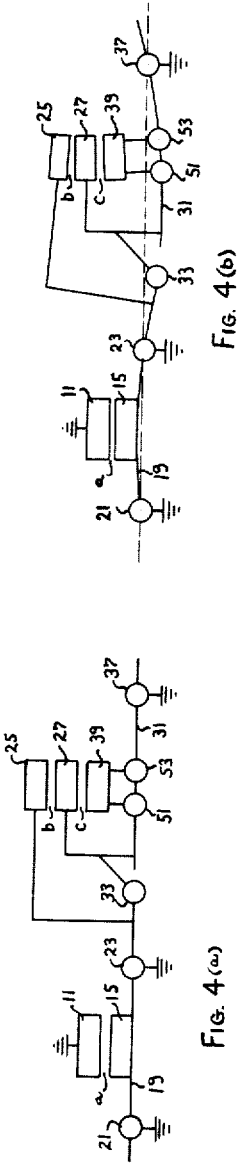
FIG. 4(b)
FIG. 4(a)
INVENTORS
CHARLES M. WHEELER
PHILIP M. FOLGER
BY Vernon D. Kalb
ATTORNEY

United States Patent Office 3,089,971
Patented May 14, 1963

3,089,971
BEARING ARRANGEMENT FOR EDDY
CURRENT COUPLING
Charles M. Wheeler and Philip M. Folger, Erie, Pa.,
assignors to General Electric Company, a corporation
of New York
Filed June 25, 1959, Ser. No. 822,947
13 Claims. (Cl. 310—105)

This invention relates to a motor-drive coupling unit, and more particularly to an eddy current coupling equipped with a bearing arrangement for closely aligning and positively positioning its relatively rotatable parts.

Eddy current coupling devices, which are also known as eddy current clutches, offer many advantages in variable speed applications where the speed range and type of speed control do not justify the cost of direct current drive equipment. An example of this is the modern automated factory, where it is often necessary to provide speed synchronization for a plurality of drive motors, as in the starting and stopping of a production line.

An eddy current coupling device is essentially an eddy-current generator in which relative motion between a rotating armature and a rotating field provides the eddy currents, the torque being developed between opposite magnetic areas. Since such a device does not employ friction surfaces and relies for energy transfer upon the medium of electromagnetic induction, it is easy to maintain and the absence of friction surfaces eliminates resultant wear. In addition, the electromagnetic coupling principle cushions the transfer of energy, thus minimizing torsional strains and shocks, and resulting in relatively quiet operation.

One type of prior art eddy current coupling device incorporates a stationary field coil. This construction has the advantage of eliminating slip rings or brushes which are a constant source of maintenance problems. However, such stationary field eddy current coupling devices require an additional air gap in the magnetic circuit and, since perfect concentricity between eddy current pole and core structures is difficult to attain, there is often a tendency for the electromagnetic parts to move radially, particularly in coupling devices of higher ratings, causing rubbing and resultant wear of the surfaces of the relatively rotatable parts in one of the air gaps. The pole and core structures may also lock due to loss of the air gap therebetween, resulting in severe damage to the coupling mechanism and/or the equipment with which it is being operated. The invention disclosed herewith substantially obviates this difficulty by providing an improved eddy current clutch mounting wherein the relatively rotatable electromagnetic parts are closely aligned and are positively positioned and supported by bearings in such a manner as to substantially eliminate the possibility of rubbing.

One object of our invention is to provide an improved eddy current coupling which greatly reduces the pulling together of coupling parts due to unbalanced magnetic forces.

Another object of this invention is to provide an improved eddy current clutch mounting which has inherently accurate gap alignment by having a reduced number of mechanical parts upon which the air gap between the pole structure and the core structure depends.

A further object of this invention is to provide an improved eddy current coupling mounting means, wherein the air gap between the core and pole structures remains generally unchanged despite any initial unbalance therebetween, thereby substantially eliminating the possibility of rubbing of the coupling parts.

In carrying out my invention, in one form thereof a stationary field eddy current coupling is provided which comprises a casing member, an annular eddy current drum, a coupling shaft, an annular rotatable pole structure, and a core member having an exciting coil thereon. The annular eddy current drum is affixed to a drive shaft of a motor which may be supported in a housing common to the coupling. The coupling shaft is in general axial alignment with the drive shaft and extending outwardly from another portion of the housing. The annular rotatable pole structure is secured to the coupling shaft and includes an inner annular surface in bearing relationship with the drive shaft. Disposed radially inwardly from the pole structure is the core member, which "floats" upon the coupling shaft by means of a bearing assembly which supports the core upon the coupling shaft and means are further provided for restraining rotary movement of the core while permitting radial movement thereof.

The novel features that are considered characteristic of this invention are set forth with particularity in the appended claims. The invention itself, however, both as to its organization and method of operation, as well as additional objects and advantages thereof, will best be understood from the following description when read in conjunction with the accompanying drawings.

FIGURE 2 is an axial half section of the improved stationary field eddy current coupling incorporating one embodiment of our invention.

FIGURE 4(a) is a schematic representation of the bearing arrangement and air gap dispositions for the improved coupling incorporating one embodiment of our invention, when there is no shaft deflection.

FIGURE 4(b) is a schematic representation of the bearing arrangement and air gap distributions for the improved coupling incorporating one embodiment of our invention, when shaft deflection occurs.

Figure 1:
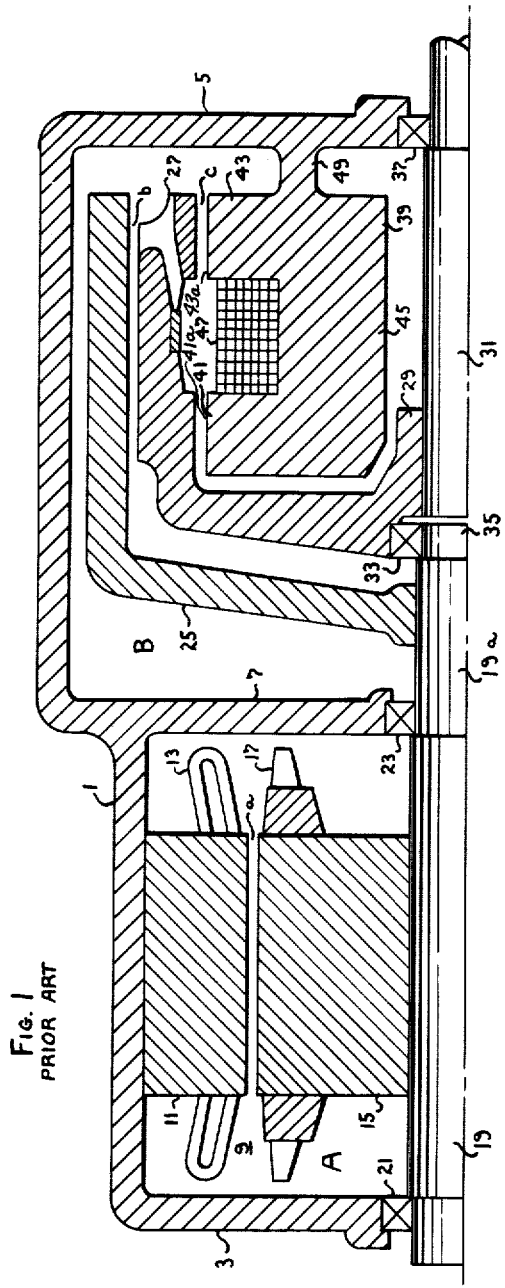
FIGURE 1 is an axial half section of the typical prior art stationary field eddy current coupling.
Figure 3B:
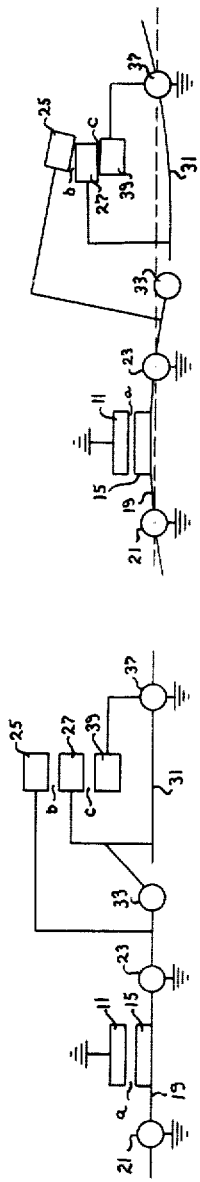
FIGURE 3(b) is a schematic representation of the bearing arrangement and air gap dispositions for the typical prior art coupling when shaft deflection occurs.
Figure 3A:
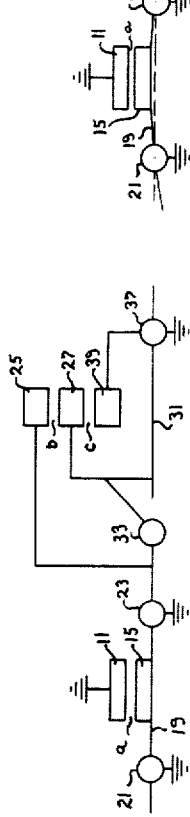
FIGURE 3(a) is a schematic representation of the bearing arrangement and air gap dispositions for the typical prior art coupling when there is no shaft deflection.

Our invention can be better understood by first considering the prior art construction, which is illustrated in detail in FIG. 1 and schematically in FIGURES 3(a) and 3(b). In FIGURE 1 the numeral 1 indicates the casing or frame structure for housing the elements of a prior art eddy current coupling and includes end walls 3 and 5 and intermediate wall 7, a portion of which essentially divides the frame structure into compartments A and B. In compartment A which is disposed on the left, a drive motor 9 is mounted. Stator 11 of motor 9 is supported from the inner periphery of housing 1 and includes windings 13 which are mounted thereon. Rotor 15 of motor 9 includes heat radiating fins 17 and motor shaft 19 extending therethrough. The motor shaft 19 is rotatably supported by suitable bearings 21 and 23 which are contained by and mounted respectively upon end wall 3 and intermediate wall 7 of the frame structure. The motor air gap between stator 11 and rotor 15 of the drive motor 9 is indicated as "a."

The portion 19a of the motor shaft 19 which may be termed the eddy current coupling input shaft, extends through bearing 23 into compartment B, and mounted upon this extending portion is an annular eddy current drum 25 which is rotatable therewith. Drum 25 is of generally cup-shaped configuration and includes an uninterrupted inner cylindrical surface. Pole structure 27 is spaced radially inwardly from the inner cylindrical surface of drum 25, and includes a plurality of spacedly interdigitated pole-forming teeth that are not shown for purposes of simplification. The space between the outer periphery of pole structure 27 and the inner surface of drum 25 forms working air gap "b." Pole structure 27 is mounted on a coupling or output shaft 31 by means of an annular disc or spider 29 and is rotatably supported on the motor shaft 19 by means of a bearing 33 which is positioned between the pole structure and the periphery of the inwardly extending end 35 of shaft 19. The bearing support given to the pole structure by bearing 33 serves to align and maintain working air gap "b," and also provides a bearing support for the left side of the coupling shaft 31, since the pole structure is secured to shaft 31. The right side of coupling shaft 31 is rotatably supported by bearing 37 which is mounted upon end wall 5 of compartment B. The bearing 33 is often termed a pilot bearing.

Spaced radially inward from the inner concentric wall of pole structure 27 is core member 39, which is U-shaped in cross section and provides the "stationary" field for the eddy current coupling device. The U-shaped core half section provides leg portions 41 and 43 and base connecting portion 45. The terminating ends 41a and 43a of legs 41 and 43, respectively, define the annular periphery or peripheral surfaces of the core 39. The base portion 45 defines an axial passage therethrough, through which extends shaft 31. A coil 47 is wound about the circumferential groove formed between legs 41 and 43 to complete the core and field structure. In accordance with the prior art practice, annular support 49 indicates a typical means for mounting the core and field structure, which consists of integrally securing the core and field coil to the frame structure 1. Air gap "c" is then provided between the inner concentric wall of pole structure 27 and the outer concentric wall of core 39, and this gap is essentially cylindrically uninterrupted and uniform.

In operating the eddy current coupling device of FIGURE 1 the coupling shaft 31 is connected at its right end to a suitable load (not shown) and the coils 13 of the motor stator 11 are excited. This causes the motor rotor 15 to rotate and the eddy current drum 25 also rotates therewith. When the field coil 47 is excited, a toroidal field surrounds it and the strength of this field, along with the polar concentrations through the gap "b," increases according to the ampere turns of excitation. Since there is relative motion between drum 25 and the interdigitated poles of pole structure 27, concentrations of flux sweep through the drum 25. These flux concentrations generate eddy currents which in turn generate flux fields that are reactive with respect to the flux field emanating from the pole structure. This results in the rotary acceleration of the pole structure and of the coupling shaft on which it is supported, along with any load driven thereby.

When the prior art coupling construction, as described above and shown in FIGURE 1, is in use, a serious problem of unbalanced magnetic forces often occurs, particularly in coupling devices of higher power ratings. In electromagnetic machines it is well-known that the net radial magnetic force per unit of displacement from concentricity of the magnetic parts may be approximated as follows:

$$\frac{Fm}{d_0+d} = K_1 \text{ lbs. per unit of displacement (magnetic "spring constant")}$$

where, $Fm$ = net radial magnetic force,
$d_0$ = radial displacement with no mechanical or magnetic force applied (initial eccentricity), and
$d$ = radial displacement due to applied mechanical or magnetic forces.

The mechanical forces for restoring imperfectly concentric magnetic parts of an electromagnetic machine to concentricity are principally provided by the axial stiffness of shafts and frame members. In such machines, only the restoring forces afforded by the shafts need be considered from a practical standpoint since they are weaker and therefore limiting. Therefore, within the elastic limits of the shafts concerned, the mechanical "spring constant" may be approximated by:

$$\frac{Fr}{d} = K_2 \text{ lbs. per unit of displacement (magnetic "spring constant")}$$

where, $Fr$ = radial restoring force, and
$d$ = radial displacement due to applied mechanical or magnetic forces It has further been found that when the magnetic "spring constant" $K_1$ exceeds the restraining mechanical "spring constant" $K_2$, any small eccentricity $d_0$ will cause the electromagnetic parts to move radially and rub against each other. Stationary field eddy current couplings, such as described above and shown in FIGURE 1, are particularly subject to this type of failure. In FIGURE 1 the working gap "b" of the coupling device is aligned and maintained uniform by bearing 33. Unbalanced magnetic forces across gap "b" are thus not likely to close this gap. But if in this eddy current coupling device there is imperfect concentrciity of the pole structure 27 and core member 39, this would cause the resulting radial magnetic forces to act in such a direction as to close air gap "c" due to the unbalanced magnetic field distribution. As air gap "c" tends to close, the stiffness of motor shaft 19 provides the principal mechanical radial restoring force $Fr$. Simultaneously, working air gap "b" then tends to close, adding to the magnitude of the distorting magnetic forces and aggravating the unbalance. Coincident reduction in motor gap "a" further aggravates this condition. Similarly, initial unbalance in gap "c" or gap "b" can initiate the distortions shown in FIGURE 3(b).

FIGURES 3(a) and 3(b) more clearly show in schematic form the air gap closure of the prior art coupling device of FIGURE 1 for perfect and imperfect concentricities respectively, and like elements of FIGURES 3(a) and 3(b) are identified by the same numbers by which they are represented in FIGURE 1. By comparing the air gap dispositions of gaps "b" and "c" for coupling devices with perfect and imperfect concentricities, it may be clearly recognized that imperfect concentricity of the pole structure 27 and core 39 results in the closure of both air gaps "b" and "c."

The remedy for the unbalancing problem which is presented by the prior art construction of a stationary field eddy current couplnig is the subject of this invention, and the construction which is illustrated in FIGURE 2 represents one embodiment. This construction is in most respects identical to the aforementioned arrangement which is shown in FIGURE 1 with the exception of the provisions for a "floating" support for the core structure, and a restraining means for limiting the rotary movement of this core structure. In contrast to the prior art core mounting, wherein the core is rigidly mounted to the frame member, this invention provides a "floating" support arrangement wherein the core structure 39 is mounted on two ball bearing members 51 and 53 which rotatably space the core and field structure from coupling shaft 31. Any type or number of bearing support means could be utilized in place of the two ball bearings shown, and ball bearings 51 and 53 represent but one example.

In order to prevent rotary movement of the core and field structure, and at the same time permit radial movement thereof, a projecting pin 55 spurs outwardly from rim 43 and is received by radial slot 57 which is formed in the interior of end wall 5 of frame 1. Any type of restraining means for limiting rotary movement of the core structure relative to the frame member while not restricting radial movement could be utilized, and the pin and slot arrangement shown represents but one method of accomplishing this result. By providing a floating supporting arrangement for the core structure of the eddy current coupling device, as shown by the schematic representations in FIGURES 4(a) and 4(b), wherein like elements are identified by the same numerical representations as in FIGURE 2, the ball bearings 51 and 53 align and maintain the air gap "c" while bearing member 33 aligns and maintains working air gap "b." If the shafts tend to deflect or bend due to imperfect concentricity, the core structure 39 moves with the pole structure 27, since they are both principally supported by coupling shaft 31, and any initial unbalance of magnetic forces across gap "c" does not change or tend to close the gap, as in the prior art devices. In addition, to prevent closure of gaps "b" and "c" when an initial eccentricity occurs in the assembly, this new and improved mounting means minimizes such initial eccentricity. In the prior art device of FIG. 1, for example, the peripheral uniformity of gap "c" is determined by the concentricities and tolerances of several mating parts of the housing structure 1 and components of the rotating assembly, and is cumulative of all the tolerances and errors occurring in such parts. In contrast, the same gap "c," of the construction of this invention, as shown in FIG. 2, is more readily held uniform because the pole structure 27 and the field structure 39 have their position determined from being mounted on a common shaft 31. It will be readily apparent that the outer diameter of field structure 39 may be turned so that it is more nearly concentric with respect to its bore than with reference to any other surface or reference point. In addition, the mounting of pole structure 27 and the field structure 39 on a common shaft, as shown in FIG. 2, will serve to positively position and align these parts in a concentric relationship when the coupling device is reassembled after maintenance.

By means of this improvement in the mounting of the core structure of an eddy current coupling device, there is clearly afforded an important expedient for substantially eliminating the rubbing of the electromagnetic parts thereof, thus providing a significant reduction in maintenance and replacement expenses incurred by the normal day-to-day operation of such devices.

In view of the above, it will be seen that the several objects of the invention are achieved and other advantageous results attained.

While we have herein shown and described a typical embodiment of my invention, it will be understood that the invention is not limited to the precise details described or to the exact operation set forth.

What we claim as new and desire to secure by Letters Patent of the United States is:

1. A stationary field eddy current coupling comprising a frame member, a motor mounted upon said frame member, said motor including a motor shaft, first and second axially spaced bearing means for rotatably supporting said motor shaft upon said frame member with a portion of said motor shaft extending beyond said second bearing means, an annular eddy current drum mounted on said extending portion of said motor shaft for rotation therewith, a coupling shaft having one end spaced from the end of the extending portion of said motor shaft and in normal axial alignment with said motor shaft, a pole structure mounted on said coupling shaft for rotation therewith and having its outer periphery in substantially concentric spaced relationship with the inner periphery of said drum to form a first air gap, said pole structure providing an inner annular surface which overlaps said end of said motor shaft, a third bearing means for rotatably supporting said inner surface upon said end of the motor shaft, a fourth bearing means for rotatably supporting said coupling shaft upon said frame member, an annular core member having its outer periphery in substantially concentric spaced relationship with the inner periphery of said pole structure to form a second air gap, a field coil on said core member, a fifth bearing means supporting said core member upon the coupling shaft between said fourth bearing means and said end of said coupling shaft, said fifth bearing means causing said second air gap to be maintained substantially uniform if the motor shaft and the coupling shaft depart from axial alignment, and restraining means for limiting rotary movement of said core member.

2. The coupling according to claim 1 in which the annular core member has a cross sectional configuration of generally U shape.

3. The structure of claim 2 in which the restraining means comprises a pin which extends outwardly from a side portion of the core member and a slot in the frame member for receiving said pin.

4. The structure of claim 1 in which the fifth bearing means comprises two axially spaced ball bearings.

5. A stationary field eddy current coupling comprising a frame member having two oppositely disposed end walls with an intermediate wall therebetween to form first and second compartment sections, a motor mounted within the first compartment section, said motor including a motor shaft, a first bearing means for rotatably supporting said motor shaft on the end wall of the first compartment section, a second bearing means for rotatably supporting said motor shaft on the intermediate wall of said frame member, said motor shaft including a portion extending into the second compartment section and having a terminating end therein, an annular eddy current drum mounted on said extending portion of the motor shaft for rotation therewith, a coupling shaft having an extending end spaced slightly from the inner end of and in normal axial alignment with said motor shaft, a pole structure having inner and outer peripheries mounted on the coupling shaft for rotation therewith and having its outer periphery in substantially concentric spaced relationship with the inner periphery of the drum to form a first air gap, said pole structure providing an inner annular surface which overlaps the adjacent extending end of the motor shaft, a third bearing means for rotatably supporting said inner surface upon the extending end of the motor shaft, a fourth bearing means for rotatably supporting said coupling shaft on the end wall of the second compartment section, an annular core member having a cross sectional configuration of generally U shape and having its outer periphery in substantially concentric spaced relationship with the inner periphery of the rotating pole structure to form a second air gap, a field coil on said annular core member, said core member being carried on said coupling shaft by fifth bearing means whereby if the motor shaft and the coupling shaft depart from axial alignment said fifth bearing means maintains the second air gap between the outer periphery of said core member and the inner periphery of said pole member, and means restraining rotary movement of said core member.

6. An eddy current coupling comprising a spaced bearing support means, a rotatable input shaft and an eddy current drum having a cylindrical portion secured to said input shaft to rotate therewith, an output shaft, bearing means in said bearing support means rotatably supporting said shafts, a pole structure having inner and outer peripheries secured to said output shaft to rotate therewith, said pole structure outer periphery defining an air gap with said eddy current drum, pilot bearing means between said input shaft and said output shaft axially aligning said shafts, a core member having an outer periphery in substantially concentric spaced relationship with the inner periphery of said rotating pole structure to define an air gap therebetween, bearing means mounting said core member on said output shaft and means interconnecting said bearing support means and said core member for restraining rotary movement of said core member.

7. An eddy current coupling comprising a housing member having bearing support means in the ends thereof, an input shaft extending into said housing, said input shaft being rotatably positioned by bearing means in a first of said bearing support means, an output shaft axially spaced from and axially aligned with said input shaft in said housing and extending from the opposite end of said housing, bearing means axially aligning said shafts, said output shaft being rotatably positioned by bearing means in the second of said bearing support means, an eddy current drum mounted on said input shaft for rotation therewith, said drum having a cylindrical portion coaxial with said output shaft, a pole structure mounted on said output shaft to rotate therewith, said pole structure having an outer periphery in substantially concentric spaced relationship with an inner periphery of the drum to define an air gap therebetween, an annular magnetic core member having an outer periphery in substantially concentric spaced relationship with an inner periphery of the pole structure to define an air gap therebetween, bearing means on said output shaft mounting said core member thereon, and means interconnecting said core member and said housing for restraining rotary movement of said core member.

8. The eddy current coupling of claim 7 wherein the input shaft comprises an extension of a drive motor shaft.

9. In an eddy current coupling comprising a housing member, an input shaft rotatably mounted in one end of said housing member, an output shaft rotatably mounted in an opposite end of said housing member, bearing means axially aligning said shafts, a core member of magnetic material having excitation means thereon, bearing means mounting said core member on said output shaft and means interconnecting said housing and said core member for restraining rotary movement of said core member.

10. An eddy current coupling comprising, spaced bearing support means, first and second shafts rotatably supported in said support means, first bearing means axially aligning said shafts, a magnetic core member having an annular peripheral surface, a core-exciting coil on said core member, said core member defining a passage axially therethrough, one of said shafts extending through said passage, second bearing means on said one of said shafts within said passage mounting said core member on said one of said shafts, a first eddy current coupling member mounted on said one of said shafts for rotation therewith, said coupling member having an annular peripheral surface concentrically overlying said peripheral surface of said core member to define a first air gap therebetween, means restraining said core member from rotary movement, and a second eddy current coupling member mounted on the second of said shafts for rotation therewith and having an annular inner peripheral surface concentrically overlying said first eddy current coupling member and defining an air gap therebetween.

11. The eddy current coupling of claim 10 wherein the second of said shafts is an extension of a motor shaft.

12. In an eddy current coupling of the type wherein first and second relatively rotatable members associated with first and second rotatably supported shafts respectively are arranged as an inner and an outer member with an air gap therebetween, the improvement comprising: means for stationarily mounting a field member concentrically within said inner member and for maintaining a substantially uniform gap therebetween, said means including bearing means for rotatably supporting said field member on the shaft associated with said inner member so that said field member is disposed coaxially within said inner member and defines an air gap with the internal peripheral surface thereof; and means restraining rotary movement of said field member.

13. An eddy current coupling comprising: first and second rotatably supported, axially aligned shafts; an eddy current drum having an inner annular peripheral surface and being affixed to said first shaft for rotation therewith; a pole assembly having inner and outer annular pheripheral surfaces and being affixed to said second shaft for rotation therewith, the inner annular peripheral surface of said drum and the outer annular peripheral surface of said pole assembly defining a first annular air gap; a magnetic core member having an outer annular peripheral surface and an axial bore arranged for the passage of said second shaft therethrough, the outer annular peripheral surface of said core member and the inner annular peripheral surface of said pole assembly defining a second annular air gap; a core-exciting coil associated with said core member; bearing means for rotatably supporting said core member on said second shaft; and means for restraining rotary movement of said core member.

References Cited in the file of this patent

UNITED STATES PATENTS

| | | |
|---|---|---|
| 1,350,424 | Schurch | Aug. 24, 1920 |
| 1,493,853 | Fraser | May 13, 1924 |
| 2,838,702 | Winther | June 10, 1958 |

FOREIGN PATENTS

| | | |
|---|---|---|
| 1,075,450 | France | Apr. 14, 1954 |
| 743,400 | Great Britain | Jan. 11, 1956 |

UNITED STATES PATENT OFFICE

CERTIFICATE OF CORRECTION

Patent No. 3,089,971                               May 14, 1963

Charles M. Wheeler et al.

It is hereby certified that error appears in the above numbered patent requiring correction and that the said Letters Patent should read as corrected below.

Column 6, line 34, strike out "extending" and insert instead -- inner --; line 35, strike out "inner" and insert instead -- extending --; column 8, line 17, after "uniform" insert -- air --.

Signed and sealed this 26th day of November 1963.

(SEAL)
Attest:
ERNEST W. SWIDER                               EDWIN L. REYNOLDS

Attesting Officer                               Acting Commissioner of Patents